United States Patent [19]

Redman

[11] 4,064,409
[45] Dec. 20, 1977

[54] FERROFLUIDIC ELECTRICAL GENERATOR

[76] Inventor: Charles M. Redman, 2020 Huntington Drive, Las Cruces, N. Mex. 88001

[21] Appl. No.: 709,356

[22] Filed: July 28, 1976

[51] Int. Cl.² .............................................. H02N 4/00
[52] U.S. Cl. ...................................... 310/306; 310/10; 310/11; 335/47; 165/105
[58] Field of Search .................... 310/4, 10, 11, 12, 14; 165/105; 335/47

[56] References Cited

U.S. PATENT DOCUMENTS

| | | | |
|---|---|---|---|
| 428,057 | 5/1890 | Tesla | 310/4 |
| 476,983 | 6/1892 | Edison | 310/4 |
| 1,556,183 | 10/1925 | Viz | 310/4 |
| 2,510,800 | 6/1950 | Chilowsky | 310/4 |
| 3,122,663 | 2/1964 | Kach | 310/11 |
| 3,302,042 | 1/1967 | Grover et al. | 310/4 |
| 3,375,664 | 4/1968 | Wells, Jr. | 310/4 X |
| 3,682,239 | 8/1972 | Aba-Romia | 310/2 X |
| 3,906,415 | 9/1975 | Baker | 335/49 X |

OTHER PUBLICATIONS

"Magnetic Fluids Engineering Kit & Applications Sketches," Ferrofluidics Corp., Burlington, Mass.

*Primary Examiner*—Donovan F. Duggan
*Attorney, Agent, or Firm*—Nathan Edelberg

[57] ABSTRACT

This disclosure is related to electrical generators which utilize heating and cooling of separate points in a closed circuit ferrofluid system to generate electrical power directly from heat energy. The characteristic of ferrofluids to experience rapid change in their magnetic properties with temperature is utilized by placing a magnet around the circuit to create a self-pumping action of the ferrofluid through a solenoid to generate electric power.

5 Claims, 6 Drawing Figures

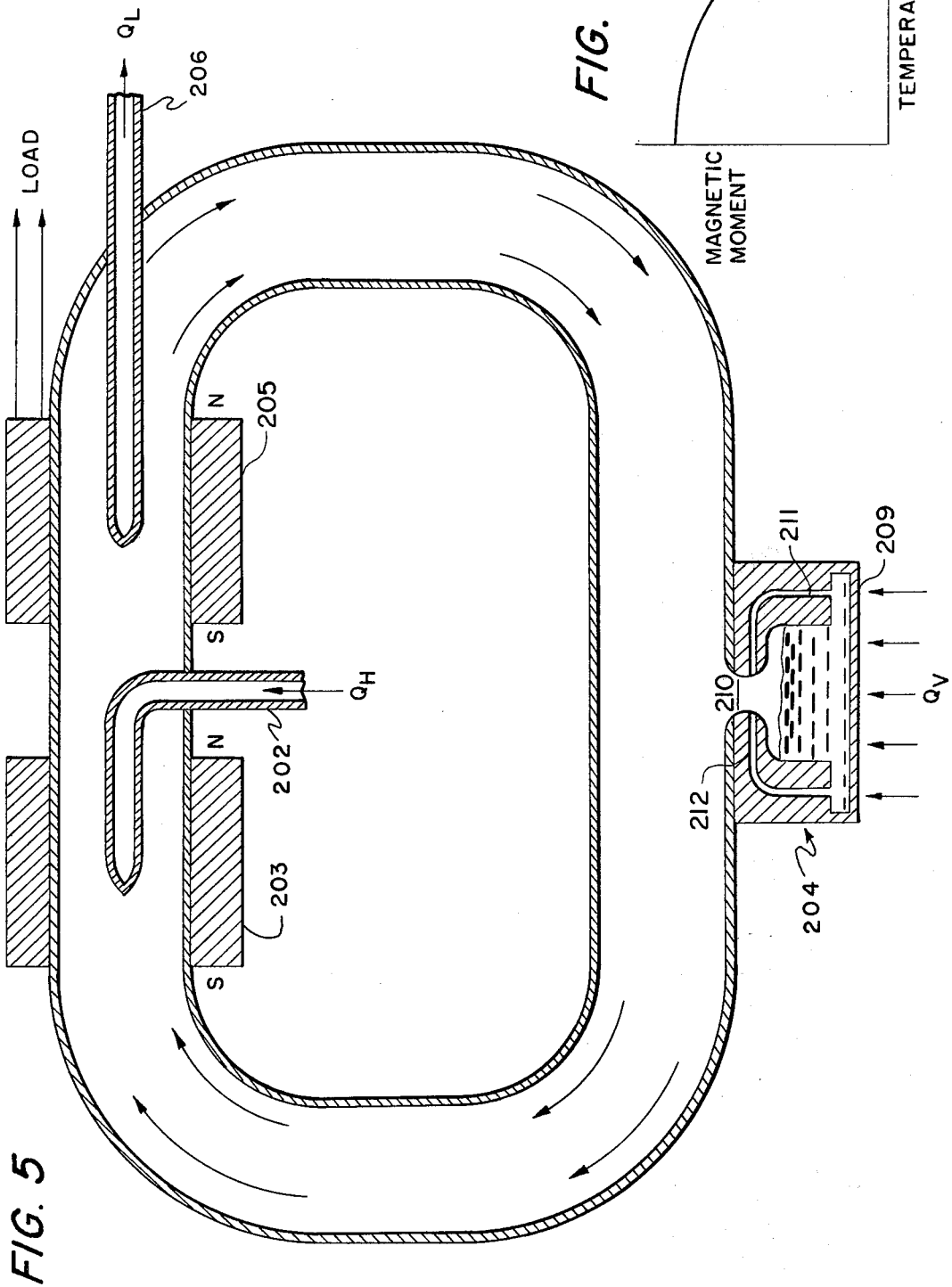

FERROFLUIDIC ELECTRICAL GENERATOR

The invention described herein may be manufactured, used and licensed by or for the Government for Governmental purposes without the payment to me of any royalties thereon.

This invention relates to electrical generators and in particular to ferrofluidic electrical generators.

There are many types of electrical generators, most of which convert thermal energy to fluid energy to mechanical energy to electrical energy. The principal sources of electrical power convert thermal energy generated by burning coal or gas or by atomic fission to superheated steam which is then converted to rotary mechanical power through a turbine which, in turn, drives an electro-mechanical generator.

It has also been proposed to use a closed loop ferrofluid system to drive a turbine for generation of power. In such a system, ferrofluids which undergo large changes in their magnetic properties with temperature are subjected to heating and cooling at separate points of the closed loop so that, by use of an electromagnet, a self-pumping action can be created which may be used to drive the turbine.

In contrast to these prior art electrical generators, this invention transfers thermal energy from almost any source to a ferrofluid which directly creates electrical energy in a solenoid.

An object of the present invention is to provide an apparatus that simplifies the generation of electrical power by eliminating the mechanical stages.

Another object of this invention is to produce an electrical power generator with no mechanically moving elements that can use almost any fuel.

A further object of the present invention is to provide an electrical generator which operates quietly with very little vibration so that it may be mounted anywhere without interfering with the use and operation of other systems.

Another object of this invention is the provision of an electrical power generator that will be self-regulating by virtue of an electrical current output increasing the back electromagnetic force and, therefore, the power.

Other objects and advantages of the invention will become apparent from a reading of the detailed description in connection with the drawings in which:

FIG. 5 is cross-sectional view of still another embodiment of the invention.

FIG. 6 is a graph depicting the properties of the particles suspended in the ferrofluid as a function of temperature.

Figure 1:
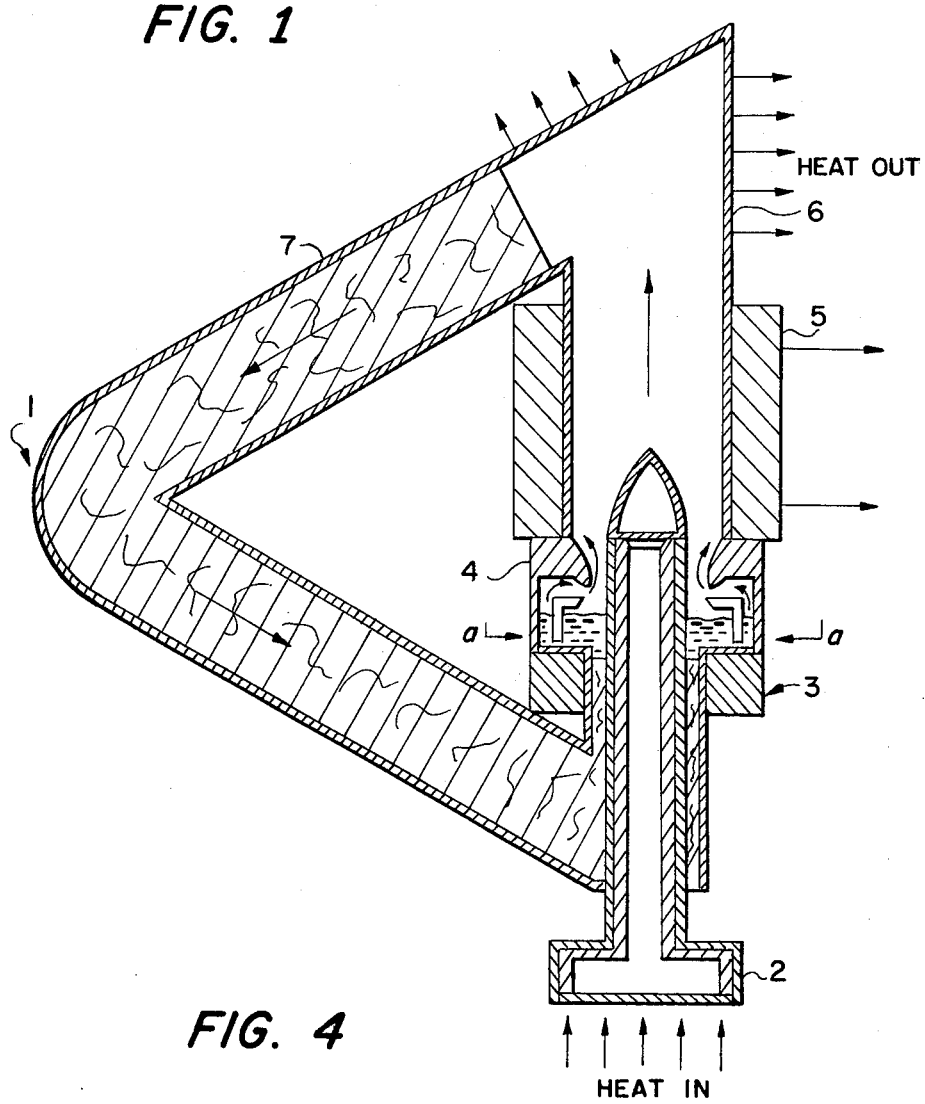
FIG. 1 is an axial cross-sectional view of a preferred form of generator embodying the invention.

Referring now to FIG. 1, there is shown a ferrofluidic heat pipe electrical generator 1 comprising a low T heat pipe 2, ring magnet 3, venturi stage 4, solenoid 5, condenser stage 6, and wick high T heat pipe 7 arranged to form a closed circuit flow path.

The medium used in the ferrofluidic generator is a colloidal suspension of $10^{18}$ magnetic particles per cubic centimeter of fluid. The fluid may be water, and the particles may be magnetite of less than 100 angstroms in diameter suitably coated to stay in suspension in water. Magnetite below 220° C. is in the form of FeO, and above that temperature it changes to $FE_2O_3$ with some excess iron. Both of these forms have equal magnetic properties; however, above 550° C., non-magnetic hematite is formed. The magnetic properties drop as shown in the curve plotted in FIG. 6.

The wick 7 provides capillary pumping of the ferrofluid and must, therefore, have small pores to allow good pumping against substantial pressure, but relatively large pores to insure that the magnetic particles pass freely and do not clog the passage. With .01 micron diameter particles a metal wick with 1.0 micron pores provides considerable freedom of movement; however, pores as small as 0.435 microns are satisfactory.

Figure 3:
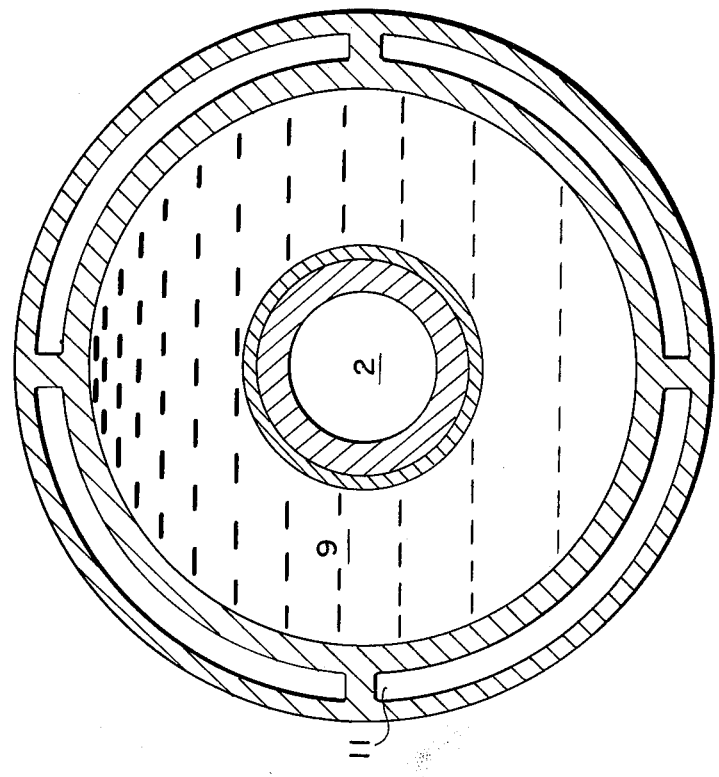
FIG. 3 is a transverse sectional view taken along line a—a of FIG. 1.
Figure 2:
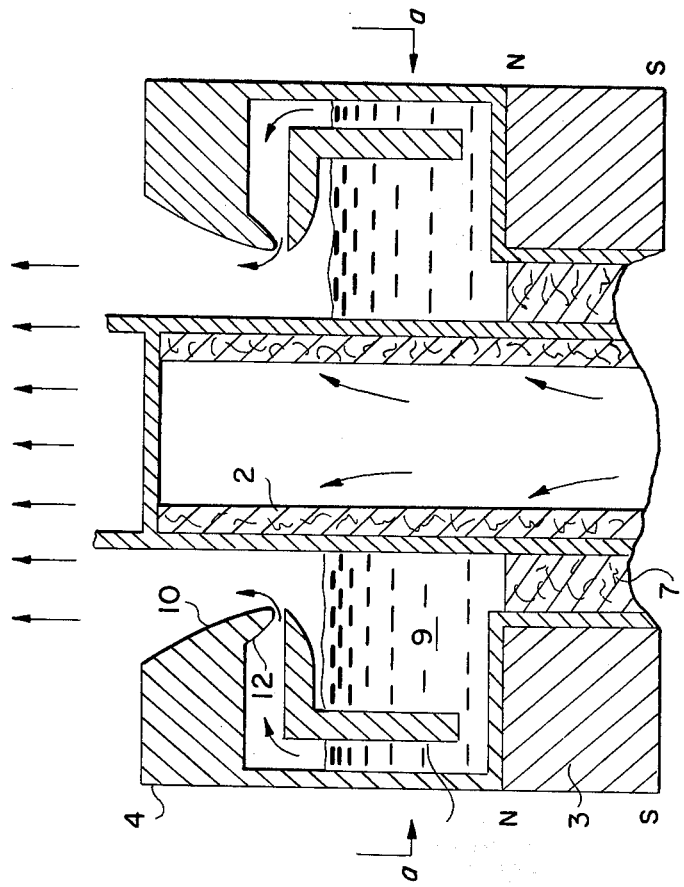
FIG. 2 is an enlarged view of the venturi stage of the generator shown in FIG. 1.

The venturi stage is best explained with reference to FIGS. 2 and 3. The venturi stage comprises an annular reservoir 9 surrounding the heat pipe 2 and directly above both the magnet 3 and the end of the wick heat pipe 7. The reservoir 9 has an upwardly directly venturi outlet opening 10 through which vapor passes upon the application of heat to the reservoir. As vapor moves up, the magnetic particles stay behind causing the concentration of particles in the liquid to increase. To correct for this, a series of by-pass passages 11 are spaced around the reservoir. These passages communicate a lower portion of the reservoir with a lateral passage 12 which, in turn, communicates with the venturi outlet opening 10. The vapor passing through the venturi 10 creates a pressure differential which draws the concentrated liquid up into the by-passes 11 and through passage 12 into the venturi where it is caused to remix with the vapor.

The operation of the ferrofluidic generator embodiment of FIG. 1 is as follows: On start-up, the wick 7 contains ferrofluid, the ring magnet 3 has a certain amount of ferrofluid trapped therein, and some ferrofluid would be held in the venturi stage. Heat insertion by low T heat pipe 2 causes the fluid in the wick heat pipe 7 to heat in the region the two pipes overlap. Inasmuch as the magnetic properties of the ferrofluid decrease with an increase in temperature, the magnet pulls the cooler fluid from below, resulting in an upward push of the warmer fluid. Heat evaporates the ferrofluid and the vapor passes through the venturi to the solenoid, and then condenses in the condenser from which liquid ferrofluid flows into the wicking. As the vapor velocity through the venturi increases, the pressure decreases and cooler ferrofluid is pulled into the passages 11, 12 from which it is injected into the throat of the venturi where it mixes with the vapor. The vapor and ferrofluid mix is further heated and forced into the solenoid. The hot ferrofluid entering the solenoid has a comparatively low magnetic property due to its high temperature. The exiting ferrofluid has expanded and cooled and has a higher magnetic property. This is opposite to the magnetic pump action and work is expended driving the fluid through the solenoid. Driving the ferrofluid through the solenoid causes an electrical current to flow which increases the solenoid electromagnetic field further restricting the flow of the ferrofluid. This is analogous to the way an electro-mechanical generator operates. The ferrofluid vapor again condenses to a liquid in the condenser and returns to the wicking. The above actions increase to keep a balance between heat flow from the low T wick heat pipe and the electrical energy output and the energy given up in the condensation of the vapor.

Figure 4:
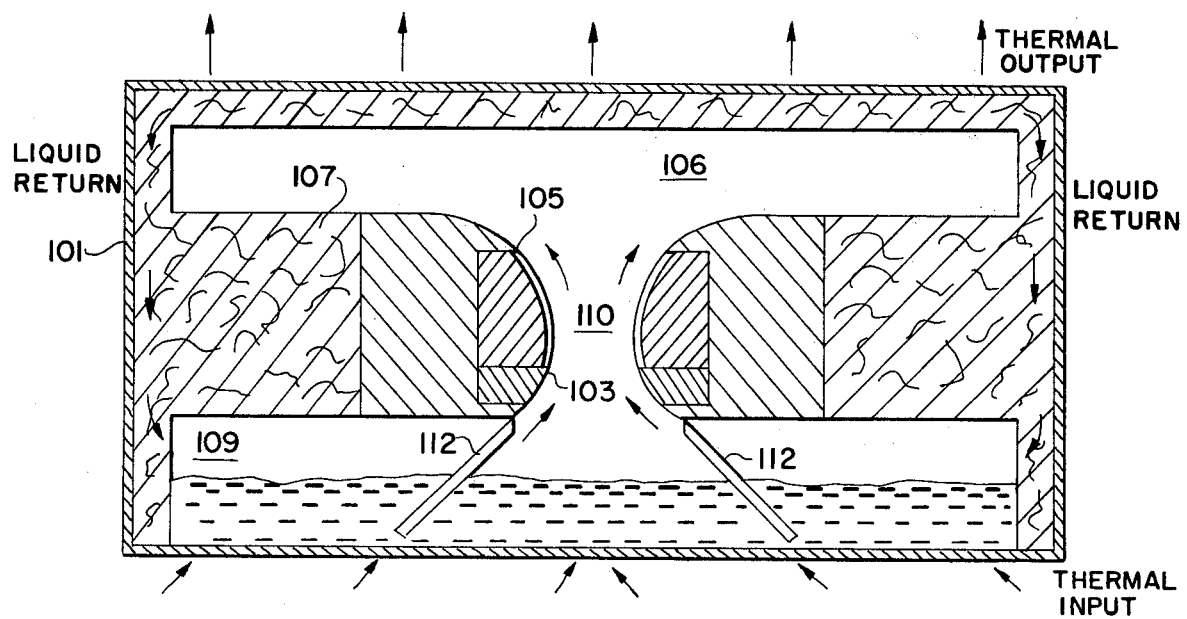
FIG. 4 is an axial cross-sectional view of an alternative embodiment of the invention.

FIG. 4 shows a cross-sectional view of alternate embodiment of a ferrofluidic generator according to the invention. Elements of the embodiments that are equivalent may readily be determined and, to aid such a comparison, the last two digits of the reference numerals of corresponding elements have been made the same, e.g. element 107 in FIG. 4 corresponds to element 7 in FIG. 1.

The operation of the ferrofluidic generator 101 is as follows: Heat is applied to the lower wall of reservoir 109 causing the ferrofluidic medium to boil. The vapor expands upwardly through the venturi opening within magnet 103 and solenoid 105. Inasmuch as the magnetic particles which are necessary to set up a flux field are left behind during the evaporation phase, pipes 112 are provided to remix the particles with the vapor. As the vapor enters the venturi it greatly increases in speed causing a reduction in pressure. Since the pressure at the top of the pipes is substantially lower than at the bottom of the liquid, the liquid ferrofluid is forced through the pipes and is sprayed into the throat of the venturi opening where it remixes with the vapor and passes upwardly through the solenoid into the condenser chamber 106. In chamber 106 heat is withdrawn and the gas is condensed into a fluid which travels back through the porous metal wick 107 to the reservoir 109 completing the flow circuit.

The toroidal magnet 103 aligns the polarity of the particles flowing through the center of the solenoid armature so as to create an electromagnetic force therein. A load placed across the output of the armature causes an electronic current to flow.

FIG. 5 illustrates a third embodiment of the invention that varies from the first two in that the wick member has been eliminated as part of the flow path. Again a comparison of the embodiments may be made from the last two digits of the reference numerals which have been maintained the same for equivalent elements.

A closed elongated donut-shaped tube 201 contains the ferrofluid and allows it to circulate. Low energy fluid circulates in the lower half of the tube and communicates with a venturi stage 204 adjacent the flow path. Thermal energy is shown as being inserted by a heat pipe 202; however, other equivalent means may be used. Since ferrofluids lose their magnetic properties as they heat up, the magnet 203 exerts a stronger force on the fluid to its left than to its right, causing a clockwise fluid flow through the solenoid 205.

The ferrofluid enters the solenoid at high temperature and low magnetic strength. Thermal energy is extracted from the ferrofluid while in the solenoid by techniques such as use of the heat pipe 206. Thus the magnetic properties are restored and the solenoid can react with magnetic particles in the fluid so as to generate a current.

Upon generator start-up, the ferrofluid is primarily in liquid form in the reservoir. The application of thermal energy $Q_H$ and extraction of energy $Q_L$ causes the ferrofluid in the tube to circulate as previously described, thereby producing a low level of electrical current from the solenoid. This current mauy be increased by applying thermal energy $Q_V$ to the reservoir 209 of the venturi stage, thereby causing liquid ferrofluid to evaporate and pass upwardly through the venturi passage 210 into the main flow path. As in the embodiment of FIG. 1, means are provided for remixing the concentrated ferrofluid remaining in reservoir with the vapor passing up through the venturi in the form of by-pass passages 211 which communicate with the venturi via lateral passage 212. In this manner the flow rate of particles through the solenoid is increased and correspondingly the power generation increases until the optimum point is reached.

As an example of the power that can be generated, neglecting heat losses other than $Q_L$ and assuming a constant 1 lb/sec flow rate volume, with a 26.29 cu ft fluid input to the solenoid at 30 psia, 1000° F., and output from the solenoid of 26.29 cu ft at 15 psia, 213° F., 379.6 BTU/lb of thermal energy will be converted into 400,402 wattsecs. Thus it can be seen that an apparatus according to the invention can generate a significant amount of power, while being a simple and quiet device with no mechanical moving parts.

In view of the above, it will be apparent that many modifications and variations may be made by those of ordinary skill in the art and it is intended that all such modifications be covered within the scope of the appended claims.

I claim:

1. A ferrofluidic electrical generator comprising a pump having a closed circuit flow path containing a ferrofluidic medium, magnet means surrounding a first portion of said flow path, solenoid means surrounding a second portion of said path located downstream of said first portion, means for applying heat to said medium upstream of said solenoid means, a venturi stage in said flow path, and means supplying heat to said venturi stage means whereby said medium is caused to travel about said closed circuit path so as to directly produce electrical output from said solenoid, said venturi stage being located upstream of said solenoid and comprising: a reservoir for said medium opening upwardly into said flow path through a venturi passage, a lateral passage means for directing liquid ferrofluidic medium into said reservoir opening in a transverse direction, and by-pass passage means communicating at one end with a lower portion of said reservoir and communicating at the other end with said lateral passage means, whereby liquid ferrofluidic medium said reservoir will be remixed with vapor ferrofluidic medium in said venturi passage.

2. The ferrofluid generator of claim 1 wherein said venturi stage is located in said flow path downstream of said magnet means.

3. The ferrofluid generator of claim 1 wherein said venturi stage is located adjacent said flow path upstream of said magnet means.

4. The ferrofluid electrical generator as set forth in claim 1 wherein said venturi stage comprises: a venturi passage defined at least in part by said first and second portions, and reservoir means in said flow path including means to remix liquid ferrofluidic medium with vapor ferrofluidic medium passing from said reservoir into said venturi passage.

5. The ferrofluidic electrical generator of claim 4 wherein said means to remix comprises a plurality of pipes extending from a lower portion of said reservoir to said venturi passage.

* * * * *